Patented Apr. 18, 1950

2,504,919

UNITED STATES PATENT OFFICE 2,504,919

PREPARATION OF OLEFINIC COMPOUNDS

Charles A. Bordner, Niagara Falls, N. Y., assignor to E. I. du Pont de Nemours & Company, Wilmington, Del., a corporation of Delaware No Drawing. Application June 18, 1946, Serial No. 677,517

16 Claims. (Cl. 260—654)

This invention relates to the preparation of olefinic compounds and particularly certain haloolefinic compounds such as the sym. dichlorethylenes and vinyl chloride.

Haloolefines such as the cis and trans dichlorethylenes have been prepared previously by the vapor phase reaction of hydrogen with polyhalohydrocarbons such as sym. tetrachlorethane, using nickel as a catalyst, but the conversions have been poor. The cis and trans dichlorethylenes have been prepared by other methods, e. g. by heating sym. tetrachlorethane with steam in the presence of iron filings. Such a method also results in relatively poor yields and is not very satisfactory for commercial use both from cost and operating standpoints. My invention is concerned with an improved method of preparing cis and trans dichlorethylenes, and other olefinic compounds, such as unsym. dichlorethylene, vinyl chloride and the like.

It is an object of my invention to provide an improved method for preparing olefinic hydrocarbons and haloolefinic hydrocarbons containing 2 to 3 carbon atoms. A further object is to provide an improved catalytic hydrogenation method for preparing such compounds, particularly halogenated olefines, such as the halogenated ethylenes, from saturated polyhalogenated hydrocarbons of 2 to 3 carbon atoms, particularly the polyhalogenated ethanes. A specific object is to provide an improved method of preparing the cis and trans isomers of dichlorethylene and vinyl chloride from sym. tetrachlorethane and 1,2,2-trichlorethane, respectively, by vapor phase reactions with hydrogen in the presence of improved catalysts. Still further objects will be apparent from the ensuing description.

The above objects are accomplished in accordance with the present invention by reacting hydrogen in the vapor phase at an elevated temperature in the presence of a metallic copper or iron catalyst with an iodine-free, saturated polyhalogenated hydrocarbon having from 2 to 3 carbon atoms and at least 1 chlorine or bromine atom attached to each of 2 adjacent carbon atoms. The reaction may be carried out with good results at temperatures over a rather wide range, but a temperature of 350 to 425° is preferred. Lower temperatures, e. g., as low as 300° C., may be employed although the conversion at such lower temperatures is poorer than at the preferred temperatures. At temperatures above about 500° C. undesirable side reactions and decomposition reactions occur at excessive rates.

It is necessary in practicing the invention to employ metallic copper or metallic iron as a catalyst. Freshly reduced copper or iron catalyst impregnated on a suitable carrier or support material is preferred. Best results are obtained when the catalyst consists of about 10% by weight of freshly reduced copper or iron impregnated on a granular refractory material such as pumice, silica gel, alumina gel, porcelain or firebrick, particularly the latter. Lower catalyst concentrations, e. g., as low as 5%, on such materials may also be used, but concentrations around 10% give best results. The catalyst may be prepared by well-known methods such as by impregnating a suitable porous support material with a copper or iron salt such as copper or iron nitrate or a copper or iron halide, followed by the reduction of the compound to the metallic state by hydrogenation at temperatures, for example, of around 400 to 500° C.

The use of a copper catalyst is preferred in most instances. When an iron catalyst is employed there is a tendency for a thermal cracking of the polyhalohydrocarbon reactant to occur along with the reaction between the polyhalohydrocarbon and hydrogen. The cracking reaction occurs to a greater extent when using iron as catalyst. However, iron does effectively catalyze the desired reaction and since products formed by the cracking reaction are useful products iron may be employed with good results. If, however, it is desired to obtain maximum yields of compounds such as the cis and trans dichlorethylenes, a copper catalyst will generally be used in preference to iron since copper is more effective and less cracking of the starting reactant occurs when copper is used.

The saturated polyhalohydrocarbons which are suitable for use as starting materials are iodine-free, saturated compounds containing 2 to 3 carbon atoms. The compounds have at least 1 chlorine or bromine atom attached to each of 2 adjacent carbon atoms, and when those are the only halogen atoms in the molecule, the resulting olefinic compound will be a non-halogenated olefin, i. e. ethylene or propylene. The preferred polyhalohydrocarbons are those which have at least 3 halogen atoms per molecule, which compounds will result in the formation of haloolefines. The compounds whose structural formula are listed below are illustrative of the compounds which may be used:

| | |
|---|---|
| $CHCl_2CHClCH_3$ | $CH_2ClCCl_3$ |
| $CH_2ClCCl_2CH_3$ | $CH_2ClCHCl_2$ |
| $CHCl_2CCl_2CH_3$ | $CCl_3CCl_3$ |
| $CCl_3CHClCH_3$ | $CHCl_2CCl_3$ |
| $CH_2ClCHClCH_2Cl$ | $CH_2ClCH_2Cl$ |
| $CHCl_2CHCl_2$ | |

The polybromides corresponding to the above polychlorides may also be used as may also the following mixed halides:

| | |
|---|---|
| $CCl_3CClF_2$ | $CHBrClCHBrCl$ |
| $CHCl_2CClF_2$ | $CHBrClCBrCl_2$ |
| $CH_2BrCBrClCH_3$ | |

The polyhaloethanes, particularly sym. tetrachlorethane and 1,2,2-trichlorethane, are the preferred reactants from which haloethylenes and particularly cis and trans dichlorethylenes and vinyl chloride, are obtained as the chief products.

The type of reaction which takes place to yield the olefinic compounds in accordance with the invention is believed to involve the reaction of 2 atoms of hydrogen with 2 halogen atoms of the polyhalohydrocarbon, each of which is a chlorine or bromine atom and 1 of which is positioned on each of 2 adjacent carbon atoms. There are formed 2 mols of hydrogen halide and an olefinic hydrocarbon or haloolefinic hydrocarbon in which the 2 carbon atoms referred to above are finally joined by a double bond as illustrated by the following equations:

$$CH_2ClCH_2Cl + H_2 \rightarrow CH_2=CH_2 + 2HCl$$
$$CHCl_2CHCl_2 + H_2 \rightarrow CHCl=CHCl + 2HCl$$
$$CH_2ClCHCl_2 + H_2 \rightarrow CH_2=CHCl + 2HCl$$
$$CH_2ClCCl_3 + H_2 \rightarrow CH_2=CCl_2 + 2HCl$$
$$CCl_3CCl_3 + H_2 \rightarrow CCl_2=CCl_2 + 2HCl$$
$$CCl_3CClF_2 + H_2 \rightarrow CCl_2=CF_2 + 2HCl$$
$$CHBrClCHBrCl + H_2 \rightarrow CHCl=CHCl + 2HBr$$
$$CH_2ClCHClCH_2Cl + H_2 \rightarrow CH_2=CHCH_2Cl + 2HCl$$

When the starting polyhalohydrocarbon contains 2 different halogen atoms on the 2 adjacent carbon atoms, the halogen of higher atomic weight is preferentially removed by the reaction with hydrogen. Thus, in the case of sym. dichlordibromethane, the bromine atoms are removed in preference to the chlorine atoms, to form 2 mols of hydrogen bromide and cis and trans dichlorethylenes as the haloethylene products.

The present method may be used effectively to produce haloolefines having at least 1 halogen atom other than iodine on at least 1 of 2 adjacent carbon atoms joined by a double bond, as in the case of the production of vinyl chloride or cis and trans dichlorethylene; or, the resulting product may contain a halogen other than iodine on a carbon atom other than those joined by the double bond, as in the case of the production of allyl chloride from 1,2,3-trichlorpropane.

The invention is further illustrated by the following examples in which yield figures are based upon the amounts of the starting polyhalohydrocarbon not recovered as such, and conversion figures are based on the amounts fed.

Example 1

A reactor consisting of a 50 mm. glass tube 55 in. long was secured in a vertical position and provided at the top with two inlets and with a thermocouple well extending the length of the reactor. The bottom end of the reactor was provided with an outlet passing to a cold water scrubber which functioned to dissolve out hydrogen halides from the product gases and condense out most of the product chlorohydrocarbons. The scrubber was connected to a low temperature cooler for condensing product not recovered in the scrubber. The reactor tube was surrounded by a furnace and the upper half of the tube was packed with ¼ in. cubes of firebrick and the lower half with similar cubes of firebrick which had been impregnated with copper catalyst. Means were provided for delivering hydrogen and the halohydrocarbon to be reacted to the upper part of the reactor at uniform desired rates. The upper half of the packed tube functioned as a vaporizer and preheater whereas the bottom half served as the reactor proper.

The material packed into the bottom half of the tube was impregnated with sufficient copper chloride to give a catalyst body containing 10% by weight of copper after the copper chloride had been reduced to the metallic state. After treating the firebrick cubes with the copper chloride solution, the mass was placed in the reactor tube and dried by a stream of air. Reduction was then accomplished by means of a stream of hydrogen at a temperature of about 400° C. The copper impregnated firebrick cubes in the lower part of the reactor tube occupied a volume of 0.0389 cu. ft.

While maintaining a temperature of 370°–390° C. in the vaporizing section of the glass tube and a temperature of 375–385 in the part of the tube containing the catalyst, hydrogen and sym. tetrachlorethane were fed into the system at rates of 0.0265 cu. ft. (STP) and 5.42 grams per minute, respectively. During 4 hours a total of 7.74 mols of tetrachlorethane and 8.04 mols of hydrogen were fed. That amount of hydrogen corresponds to 104% of theoretical. 8.57 mols of hydrogen chloride were recovered from the product gases, together with a mixture of chlorohydrocarbons which upon fractionation yielded the following:

| Product | Mols | Mol Percent Conversion | Percent Yield |
|---|---|---|---|
| Unsym. dichlorethylene | 0.072 | 0.9 | 1.5 |
| Trans dichlorethylene | 1.805 | 23.3 | 39.9 |
| Cis dichlorethylene | 2.093 | 27.0 | 45.2 |
| Trichlorethylene | 0.442 | 5.7 | 9.5 |
| Tetrachlorethane recovered | 3.105 | 40.1 | |
| Totals | 7.517 | 97.0 | 96.1 |

Example 2

The run for this example was carried out using the same catalyst, equipment and procedure described for Example 1. During the course of 4 hours, 7.48 mols of sym. tetrachlorethane corresponding to 5.24 grams per minute and 7.04 mols of hydrogen corresponding to 0.0231 cu. ft. per minute were passed into the reactor. Both the vaporizer and catalyst sections of the reactor were maintained at a temperature of 430–440° C. The hydrogen fed was 94% of the theoretical amount. There were recovered 14.05 mols of hydrogen chloride along with a mixture of chlorohydrocarbons which upon fractionation yielded the following:

| Product | Mols | Mol Percent Conversion | Percent Yield |
|---|---|---|---|
| Unsym. dichlorethylene | 0.23 | 3.1 | 3.2 |
| Trans dichlorethylene | 1.97 | 26.3 | 27.1 |
| Cis dichlorethylene | 2.22 | 29.7 | 30.6 |
| Trichlorethylene | 1.85 | 24.7 | 25.5 |
| Tetrachlorethane recovered | 0.22 | 2.9 | |
| Totals | 6.49 | 86.7 | 86.4 |

Example 3

In a run similar to Example 1 there was employed 0.0389 cu. ft. of a catalyst consisting of ¼ in. firebrick cubes impregnated with 10% by weight of freshly reduced iron. The preheater temperature was 330–340° C. and the reactor temperature 400–415° C. There were fed at uniform rates during 4 hours 6.63 mols of sym. tetrachlorethane and 7.34 mols of hydrogen. There were recovered 6.55 mols of hydrogen chloride and a mixture of chlorohydrocarbons which on fractionation yielded:

| Product | Mols | Mol Per Cent Conversion | Per Cent Yield |
|---|---|---|---|
| Unsym. dichlorethylene | 0.041 | 0.6 | 0.8 |
| Trans dichlorethylene | 0.763 | 11.5 | 14.2 |
| Cis dichlorethylene | 0.959 | 14.5 | 17.8 |
| Trichlorethylene | 2.940 | 44.4 | 54.8 |
| Tetrachlorethylene | 0.349 | 5.3 | 6.5 |
| Tetrachlorethane recovered | 1.258 | 19.0 | |
| Totals | 6.310 | 95.3 | 94.1 |

Example 4

Vapors of 1,2,2-trichlorethane, 9.77 mols, with 10.97 mols of hydrogen were passed during 6.25 hours over 0.011 cu. ft. of a copper catalyst similar to that described in Example 1 at a temperature of 410–440° C. The products obtained and the conversions thereto were as follows:

| Product | Mol Per Cent Conversion |
|---|---|
| Vinyl chloride | 49.0 |
| Unsym. dichlorethylene | 0.6 |
| Trans. dichlorethylene | 2.9 |
| Cis dichlorethylene | 9.5 |
| Unreacted 1,2,2-trichlorethane | 34.6 |
| High boiling products (about) | 2.6 |
| | 99.2 |

Satisfactory results may be obtained employing equimolar quantities of the reactant polyhalohydrocarbon and hydrogen. Either one of the reactants may be used in excess with good results, but as a general rule no particular advantage results from employing an excess of either reactant. In general, the process of the invention will be carried out at atmospheric pressure, but pressures above or below atmospheric pressure may be used if desired.

It will be noted from the above examples that in general the amount of products, such as trichlorethylene, which are formed by thermal cracking of the starting halohydrocarbon increases as the temperature is increased. This is not particularly objectionable since trichlorethylene, for example, is itself a valuable product. However, when the object is to obtain as high a conversion as possible of compounds such as the dichlorethylenes or vinyl chloride, the higher temperatures in the operable temperature range, e. g., temperatures above about 425° C., should be avoided since at such higher temperatures the cracking reaction to produce, for example, trichlorethylene, occurs quite extensively, particularly when iron is employed as catalyst. Also, when operating at the higher temperatures there is a tendency for dehalogenation to proceed beyond, for example, the dichlorethylene stage when employing sym. tetrachlorethane as a reactant, with the result that products such as acetylene are formed which are relatively unstable at high temperatures particularly in the presence of metals.

All of the haloolefine products which may be obtained when practicing the present invention, particularly the chloroethylenes, are useful for a variety of purposes. Thus, the dichlorethylenes, trichlorethylene, and tetrachlorethylene have valuable solvent properties and such products together with vinyl chloride are useful for the production of resins of various types.

I claim:

1. A process for producing an olefinic compound comprising reacting hydrogen at a temperature of 300 to 500° C. in the presence of a metallic catalyst from the group consisting of copper and iron, with the vapors of a saturated polychlorohydrocarbon having from 2 to 3 carbon atoms and at least one chlorine atom on each of two adjacent carbon atoms.

2. The process of claim 1, wherein the reaction is carried out at a temperature of 350 to 425° C.

3. A process for producing a chloroolefinic compound comprising reacting hydrogen at a temperature of 300 to 500° C. in the presence of a metallic catalyst from the group consisting of copper and iron, with the vapors of a saturated polychlorohydrocarbon having from 2 to 3 carbon atoms and at least 3 chlorine atoms with at least 1 chlorine atom on each of two adjacent carbon atoms.

4. The process of claim 3, wherein the reaction is carried out at a temperature of 350 to 425° C.

5. The process of claim 3, wherein the reactants are employed in approximately molar proportions.

6. The process of claim 3, wherein the polychlorohydrocarbon contains 2 carbon atoms.

7. The process of claim 3, wherein the polychlorohydrocarbon employed is symmetrical tetrachlorethane.

8. The process of claim 3, wherein the polychlorohydrocarbon employed is 1,2,2-trichlorethane.

9. A process for producing an olefinic compound comprising reacting hydrogen at a temperature of 300 to 500° C. in the presence of a metallic copper catalyst, with the vapors of a saturated polychlorohydrocarbon having from 2 to 3 carbon atoms and at least one chlorine atom on each of two adjacent carbon atoms.

10. A process for the production of a chloroolefinic compound comprising reacting hydrogen at a temperature of 300 to 500° C. in the presence of a metallic copper catalyst, with the vapors of a saturated polychlorohydrocarbon having from 2 to 3 carbon atoms and at least 3 chlorine atoms with at least one chlorine atom on each of two adjacent carbon atoms.

11. The process of claim 10, wherein the reaction is carried out at a temperature of 350 to 425° C.

12. The process of claim 10, wherein the polychlorohydrocarbon employed contains 2 carbon atoms.

13. The process of claim 10, wherein the polychlorohydrocarbon employed is symmetrical tetrachlorethane.

14. The process of claim 10, wherein the polychlorohydrocarbon employed is 1,2,2-trichlorethane.

15. The process of claim 10, wherein the polychlorohydrocarbon employed is symmetrical tetrachlorethane and the reaction is carried out at a temperature of 350 to 425° C.

16. The process of claim 10, wherein the polychlorohydrocarbon employed is 1,2,2-trichlorethane and the reaction is carried out at 350 to 425° C.

CHARLES A. BORDNER.

REFERENCES CITED

The following references are of record in the file of this patent:

Borsche et al., "Berichte der deut. Chem. Gesell.," vol 48, pages 452–8 (1915).
Busch et al., Ibid., vol. 49, pages 1063–8 (1916).
Kelber, Ibid., vol. 50, pages 305–10 (1917).
Vavon et al., "Comptes Rendus," vol. 206, pages 1387–9 (1938).